(12) United States Patent
Oliver et al.

(10) Patent No.: US 8,776,196 B1
(45) Date of Patent: *Jul. 8, 2014

(54) SYSTEMS AND METHODS FOR AUTOMATICALLY DETECTING AND PREVENTING PHISHING ATTACKS

(75) Inventors: Ian Oliver, Manly Vale (AU); Adam Glick, Culver City, CA (US); Nicholas Graf, Los Angeles, CA (US); Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,051

(22) Filed: Jul. 24, 2012

Related U.S. Application Data

(60) Provisional application No. 61/621,194, filed on Apr. 6, 2012.

(51) Int. Cl.
*G06F 7/04* (2006.01)
*G06F 12/14* (2006.01)
*G06F 17/30* (2006.01)
*H04L 29/06* (2006.01)

(52) U.S. Cl.
USPC .......... 726/6; 726/5; 726/11; 726/12; 726/22; 726/26; 726/27

(58) Field of Classification Search
USPC ............................. 726/5–6, 11–12, 22, 26–27
See application file for complete search history.

(56) References Cited

U.S. PATENT DOCUMENTS

| 7,818,809 | B1* | 10/2010 | Sobel et al. | 726/26 |
| 8,429,734 | B2* | 4/2013 | Agbabian et al. | 726/10 |
| 2007/0006305 | A1* | 1/2007 | Florencio et al. | 726/22 |
| 2007/0033639 | A1* | 2/2007 | Goodman et al. | 726/2 |
| 2007/0192855 | A1* | 8/2007 | Hulten et al. | 726/22 |
| 2009/0216795 | A1* | 8/2009 | Cohen et al. | 707/102 |

OTHER PUBLICATIONS

Youngzsoft; CCProxy FAQs—Web Filter & Bandwidth Control; http://www.youngzsoft.net/ccproxy/ccproxy-faq-web-filter-bandwidth-control.htm, as accessed on Mar. 26, 2012.

* cited by examiner

*Primary Examiner* — Joseph P. Hirl
*Assistant Examiner* — Kalish Bell
(74) *Attorney, Agent, or Firm* — ALG Intellectual Property, LLC

(57) ABSTRACT

A computer-implemented method for automatically detecting and preventing phishing attacks may include (1) maintaining a credentials store for a user of the computing device that identifies both at least one known-legitimate website and credentials associated with the known-legitimate website, (2) detecting an attempt by the user to enter the same credentials that are associated with the known-legitimate website into a new website that is not associated with the credentials in the credentials store, and then, prior to allowing the credentials to pass to the new website, (3) automatically warning the user that the new website potentially represents an attempt to phish the credentials associated with the known-legitimate website from the user. Various other methods, systems, and computer-readable media are also disclosed.

20 Claims, 6 Drawing Sheets

SYSTEMS AND METHODS FOR AUTOMATICALLY DETECTING AND PREVENTING PHISHING ATTACKS

CROSS REFERENCE TO RELATED APPLICATION

This application claims the benefit of U.S. Provisional Application No. 61/621,194, filed 6 Apr. 2012, the disclosure of which is incorporated, in its entirety, by this reference.

BACKGROUND

In recent years, malicious programmers have attempted to acquire sensitive information (such as account credentials, credit card details, etc.) from unsuspecting computer users by masquerading as trustworthy entities in electronic communications. This technique, commonly known as "phishing," often involves enticing a user to enter sensitive information into an illegitimate website that imitates the look and feel of a legitimate website (such as a banking website).

While solutions for detecting phishing attacks exist, many anti-phishing techniques require that a user manually verify phishing detections since the heuristics employed by such conventional solutions are often not sufficiently accurate to produce dependable results. These solutions also typically require that users manually create and/or maintain a list of websites that are to be protected, which may result in less-than-optimal protection if users fail to create or maintain such a list.

SUMMARY

As will be described in greater detail below, the instant disclosure generally relates to systems and methods for preventing users from unintentionally entering sensitive information (such as account credentials, credit card information, etc.) into illegitimate websites. In one example, a computer-implemented method for accomplishing such a task may include (1) maintaining a credentials store for a user of a computing device that identifies both known-legitimate websites and credentials for accessing such known-legitimate websites, (2) detecting an attempt by the user to enter the same credentials that are associated with a known-legitimate website within the credentials store into a new website that is not associated with the credentials in the credentials store, and then, prior to allowing the credentials to pass to the new website, (3) automatically warning the user that the new website potentially represents an attempt to phish the credentials associated with the known-legitimate website from the user.

The systems described herein may maintain the credentials store in a variety of ways, including by creating the credentials store from scratch and/or by accessing an existing credentials store. In addition, the step of detecting the attempt may be performed by a browser plug-in installed on the computing device, a network proxy positioned between the computing device and the new website, and/or a service provider that provides the computing device with access to the new website.

In one example, the method may also include determining, prior to warning the user, that the new website potentially represents a phishing attack based on an evaluation of at least one characteristic of the new website. For example, the systems described herein may determine that the new website's domain is confusingly similar to the known-legitimate website's domain, that the new website's domain represents an IP address as opposed to a text-based domain, that the new website's IP address has been used in connection with a prior phishing attack, that the new website's registration date differs from the known-legitimate website's registration date, that the new website is hosted at a geolocation that differs from a geolocation at which the known-legitimate website is hosted, and/or that the new website fails to satisfy a predetermined prevalence threshold within a computing community.

The step of determining that the new website potentially represents a phishing attack may be performed by the computing device and/or a backend computing device that is remote from the computing device. In some examples, the method may also include performing at least one security action in connection with the new website upon determining that the new website potentially represents a phishing attack. In one example, the method may also include tailoring the warning based at least in part on at least one characteristic of the new website, the known-legitimate website, and/or the credentials associated with the known-legitimate website.

In one embodiment, the method may also include (1) detecting a predetermined number of additional attempts by the user to enter the same credentials that are associated with the known-legitimate website into the new website and then (2) associating the credentials with the new website in the credentials store upon detecting the predetermined number of additional attempts. In addition, the method may include (1) receiving an indication from the user that the new website represents a legitimate website and (2) associating the credentials with the new website in the credentials store in response to receiving the indication.

In one embodiment, a system for implementing the above-described method may include a credentials-management module programmed to maintain a credentials store for a user of a computing device that identifies both (1) at least one known-legitimate website and (2) credentials associated with the known-legitimate website. The system may also include a security module programmed to (1) detect an attempt by the user to enter the same credentials that are associated with the known-legitimate website into a new website that is not associated with the credentials in the credentials store and then, prior to allowing the credentials to pass to the new website, (2) automatically warn the user that the new website potentially represents an attempt to phish the credentials associated with the known-legitimate website from the user. The system may also include at least one processor configured to execute the credentials-management module and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) maintain a credentials store for a user of the computing device that identifies both at least one known-legitimate website and credentials associated with the known-legitimate website, (2) detect an attempt by the user to enter the same credentials that are associated with the known-legitimate website into a new website that is not associated with the credentials in the credentials store, and then, prior to allowing the credentials to pass to the new website, (3) automatically warn the user that the new website potentially represents an attempt to phish the credentials associated with the known-legitimate website from the user.

As will be explained in greater detail below, by detecting and preventing a user's credentials from passing to unexpected websites, the systems and methods described herein may 1) automatically identify and protect credentials for important websites, 2) automatically allow such credentials to pass to legitimate websites while blocking the same from passing to illegitimate websites, and 3) reduce false positives by protecting against specific phishing tricks, including the use of confusingly similar domain names and/or IP addresses instead of text-based domain names. Moreover, by leveraging an existing credentials store, the systems and methods described herein may (1) provide immediate protection against phishing attacks (instead of potentially missing phishing occurrences during a credentials-initialization process) and/or (2) protect a user's credentials regardless of which websites the user visits (as opposed to only protecting a limited set of credentials associated with websites that a security vendor deems important), potentially resulting in increased protection and reduced false positives.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
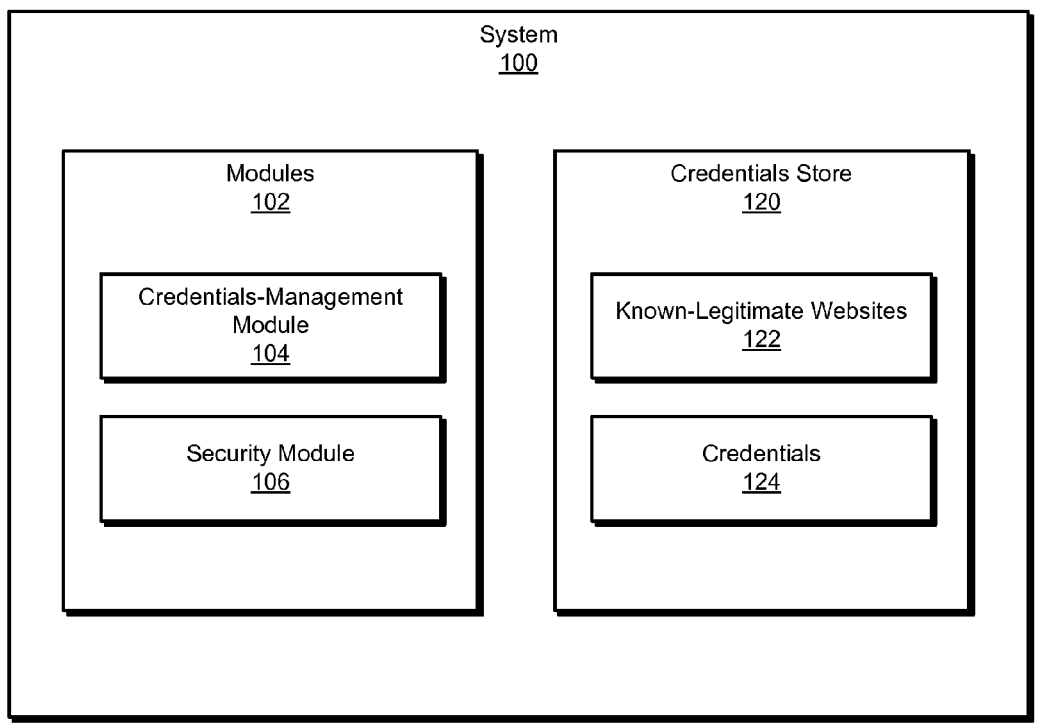
FIG. 1 is a block diagram of an exemplary system for automatically detecting and preventing phishing attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
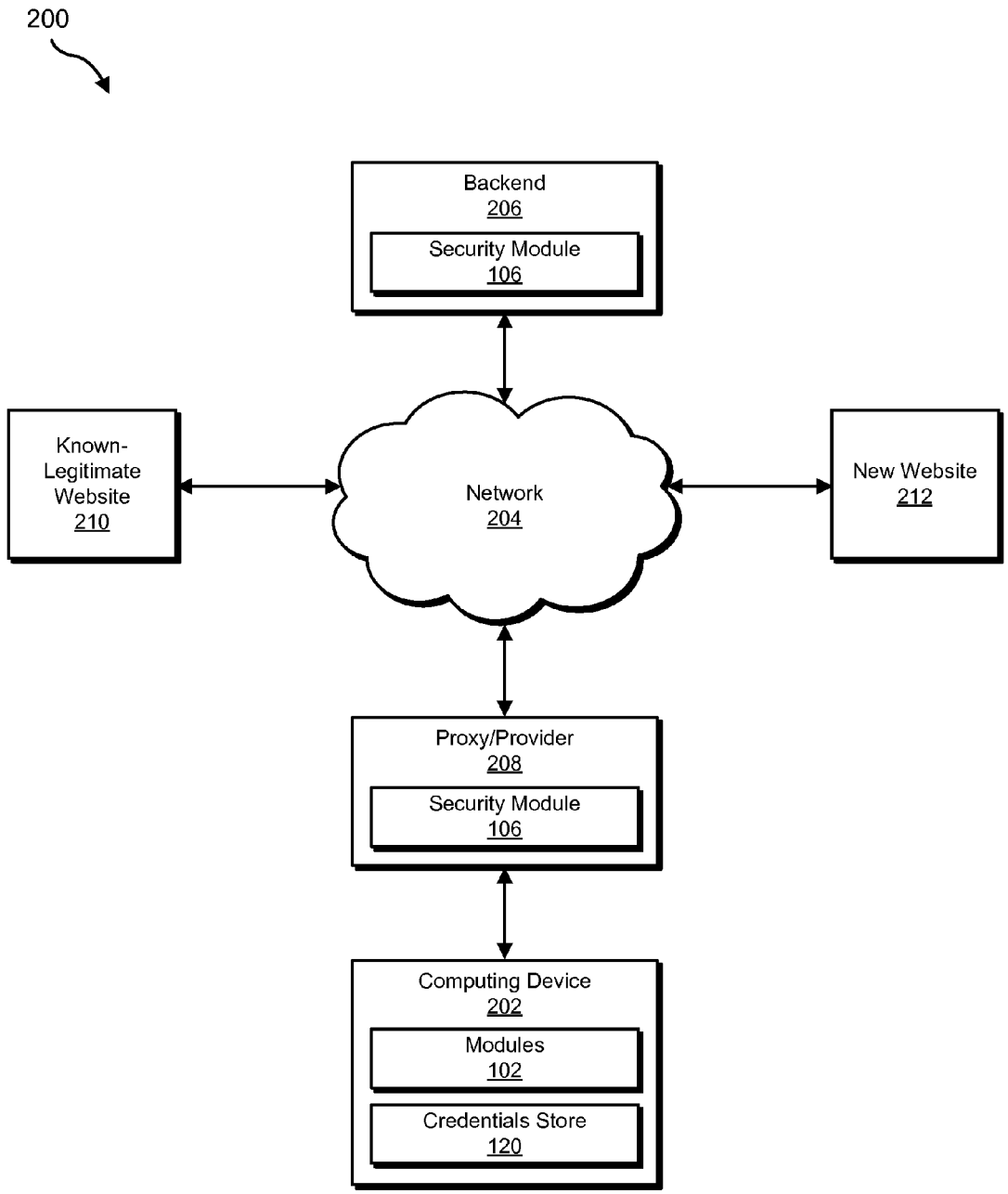
FIG. 2 is a block diagram of an exemplary system for automatically detecting and preventing phishing attacks.

The following will provide, with reference to FIGS. 1-2, detailed descriptions of exemplary systems for automatically detecting and preventing phishing attacks. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for automatically detecting and preventing phishing attacks. As illustrated in this figure, exemplary system 100 may include one or more modules 102 for performing one or more tasks. For example, and as will be explained in greater detail below, exemplary system 100 may include a credentials-management module 104 programmed to maintain a credentials store for a user of a computing device that identifies (1) at least one known-legitimate website and (2) credentials associated with the known-legitimate website. System 100 may also include a security module 106 programmed to (1) detect an attempt by the user to enter the same credentials that are associated with the known-legitimate website into a new website that is not associated with the credentials in the credentials store and then, prior to allowing the credentials to pass to the new website, (2) automatically warn the user that the new website potentially represents an attempt to phish the credentials associated with the known-legitimate website from the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, backend 206, and/or proxy/provider 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as credentials store 120. In one example, credentials store 120 may be configured to store information that identifies (1) at least one known-legitimate website and (2) credentials associated with the known-legitimate website. Credentials store 120 may represent portions of a single database or computing device or a plurality of databases or computing devices. For example, credentials store 120 may represent a portion of computing device 202, backend 206, and/or proxy/provider 208 in FIG. 2, computing system 510 in FIG. 5, and/or portions of exemplary network architecture 600 in FIG. 6. Alternatively, credentials store 120 in FIG. 1 may represent one or more physically separate devices capable of being accessed by a computing device, such as computing device 202, backend 206, and/or proxy/provider 208 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a network 204.

In one embodiment, one or more of modules 102 from FIG. 1 may, when executed by at least one processor of computing device 202, enable computing device 202 to automatically detect and prevent phishing attacks. For example, and as will be described in greater detail below, one or more of modules 102 may cause computing device 202 to (1) maintain a credentials store (e.g., credentials store 120) for a user of computing device 202 that identifies both at least one known-legitimate website and credentials associated with the known-legitimate website, (2) detect an attempt by the user to enter the same credentials that are associated with the known-legitimate website into a new website (e.g., new website 212) that is not associated with the credentials in the credentials store, and then, prior to allowing the credentials to pass to the new website, (3) automatically warn the user that the new website potentially represents an attempt to phish the credentials associated with the known-legitimate website from the user.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and one or more websites, such as known-legitimate website 210 and new website 212.

In some examples, computing device 202 may communicate with a backend 206 via network 204. Backend 206 generally represents any type or form of computing device that is capable of collecting, analyzing, and/or providing information regarding potential phishing attacks. Examples of backend 206 include, without limitation, application servers and database servers configured to provide various database services and/or run certain software applications. In one example, backend 206 may be operated and/or maintained by a security-software vendor.

In some examples, computing device 202 may connect directly to network 204. In other examples, computing device 202 may connect to network 204 via a proxy/provider 208. Proxy/provider 208 generally represents any type or form of computing device that is capable of proxying traffic between, and/or providing access to, a network, such as network 204. Examples of proxy/provider 208 include, without limitation, a network proxy positioned between computing device 202 and network 204 and/or a service provider that provides computing device 202 with access to network 204.

Figure 3:
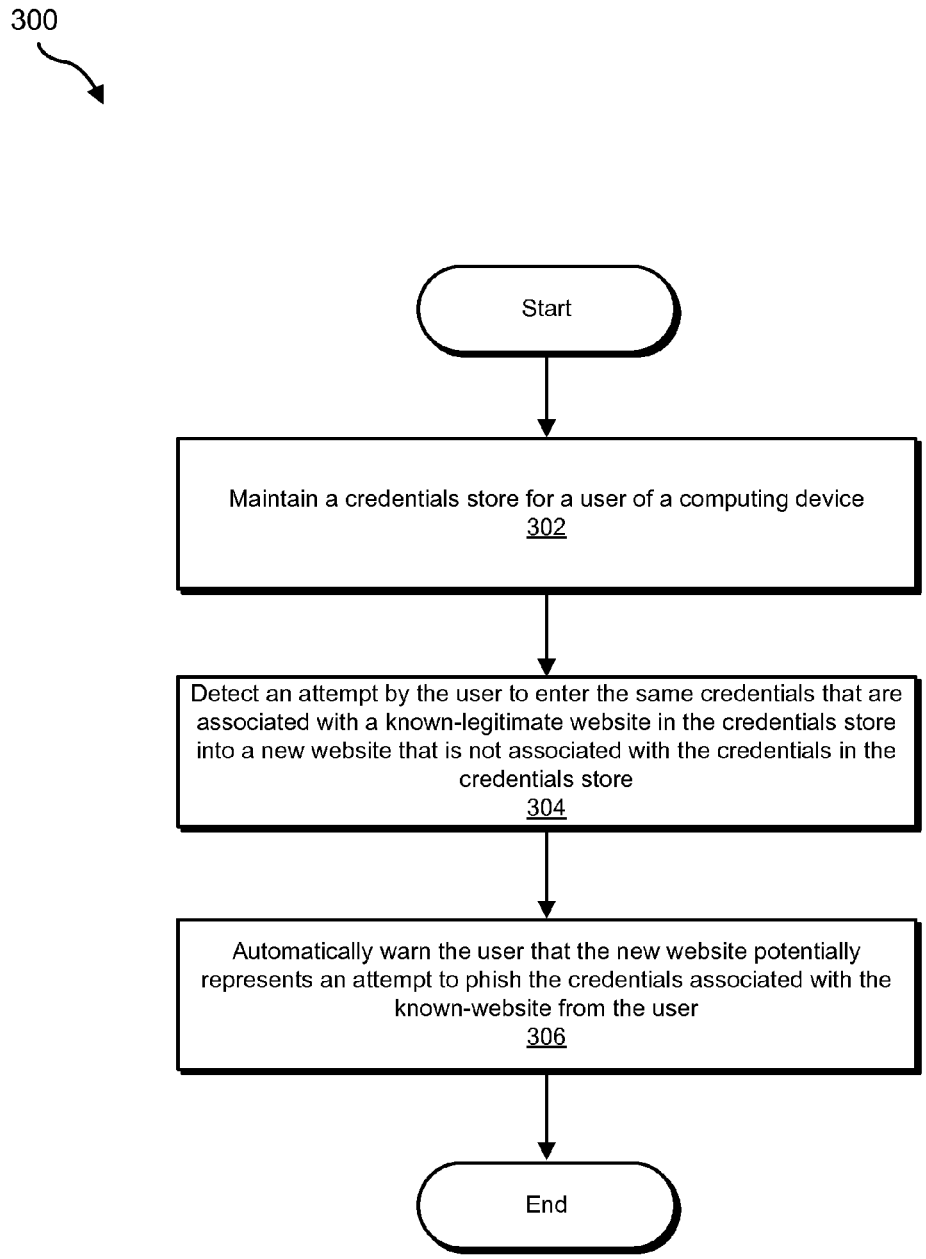
FIG. 3 is a flow diagram of an exemplary method for automatically detecting and preventing phishing attacks.

FIG. 3 is a flow diagram of an exemplary computer-implemented method 300 for automatically detecting and preventing phishing attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 2, at step 302 the systems described herein may maintain a credentials store for a user of a computing device. For example, credentials-management module 104 may, as part of computing device 202 in FIG. 2, maintain a credentials store 120 for a user of computing device 202.

The term "credentials," as used herein, generally refers to any type or form of method for controlling access to information and/or resources, such as websites. Examples of such credentials include, without limitation, account-identification information (such as account numbers and/or names), passwords, digital certificates or signatures, biometric data, and/or any other type or form of information that may be used to control access to information and/or resources. Similarly, the phrase "credentials store," as used herein, may refer to any type or form of mechanism for storing such credentials. Examples of credentials stores include, without limitation, password managers (such as NORTON IDENTITY SAFE), databases, etc.

In one example, the credentials store maintained in step 302 may contain information that identifies both known-legitimate websites and credentials for accessing such websites. For example, credentials store 120 in FIG. 1 may contain information that identifies at least one known-legitimate website (e.g., "www.wellsfargo.com"), along with a user's credentials for accessing this website (e.g., a user's username and/or password for accessing "www.wellsfargo.com").

The systems described herein may perform step 302 in a variety of ways. In one example, credentials-management module 104 may perform step 302 by creating credentials store 102, either from scratch or based on an existing data set. For example, credentials-management module 104 may create a list of known-legitimate websites (such as banking websites, gaming websites, social-networking websites, web-based email websites, etc.) that may be the target of phishing attacks. In some examples, this list of known-legitimate websites may be created from or based at least in part on an existing website whitelist, such as a global whitelist created and/or maintained by a security-software vendor.

In the above example, when a user of computing device 202 enters credentials (such as a username/password combination) into any of the known-legitimate websites identified on the list, then credentials-management module 104 may, either automatically or upon receiving confirmation from the user, store these credentials and associate the same with the legitimate website in question within credentials store 120.

In another example, the systems described herein may obtain the list of known-legitimate websites (and credentials associated with the same) from an existing credentials store or password manager, such as NORTON IDENTITY SAFE. A credentials store such as NORTON IDENTITY SAFE may enable users to easily and simply specify and enforce various Internet security measures, such as separate passwords for separate accounts, strong passwords, etc., without having to manually track and remember each of these custom, strong passwords. In this example, the systems described herein may leverage the information stored in an existing credentials store to identify those websites whose credentials are worthy of protection, as opposed to independently creating and maintaining such a list. By attaining this information from an existing credentials store, the systems described herein may protect the credentials of all legitimate websites that a user may visit, as opposed to only detecting a limited set of credentials associated with websites that a security software vendor deems important. This may, in turn, result in a system that is much more adaptive to, and capable of protecting, the individual Internet habits of users.

Returning to FIG. 3, at step 304 the systems described herein may detect an attempt by the user to enter the same credentials that are associated with the known-legitimate website into a new website that is not associated with these credentials in the credentials store. For example, security module 106 may, as part of computing device 202 in FIG. 2, detect an attempt by a user of computing device 202 to enter the same credentials that are associated with known-legitimate website 210 within credentials store 120 into a new website 212 that is not associated with these credentials in credentials store 120.

The systems described herein may perform step 304 in a variety of ways. For example, step 304 may be performed by a browser plug-in or other module installed on computing device 202, a network proxy (such as proxy/provider 208 in FIG. 2) positioned between computing device 202 and network 204, and/or a service provider (e.g., proxy/provider 208) that provides computing device 202 with access to network 204.

Using FIG. 2 as an example, security module 106 (which may, as detailed above, be installed on computing device 202 and/or proxy/provider 208 in FIG. 2) may detect an attempt by a user of computing device 202 to enter the username/password combination "johnsmith/12345678" into new website 212. In this example, security module 106 may determine, by querying credentials store 120, that the username/password combination "johnsmith/12345678" is currently associated with known-legitimate website 210 within credentials store 210, but not with new website 212. For example, security module 106 may determine that an entry for new website 212 does not exist within credentials store 120 (i.e., that new website 212 represents an unrecognized website).

Returning to FIG. 3, at step 306 the systems described herein may prior to allowing the credentials to pass to the new website, automatically warn the user that the new website potentially represents an attempt to phish the credentials associated with the known-legitimate website from the user. For example, security module 106 may, as part of computing device 202 in FIG. 2, automatically warn the user of computing device 202 that new website 212 potentially represents an attempt to phish the credentials that are associated with known-legitimate website 210 from the user.

Figure 4:
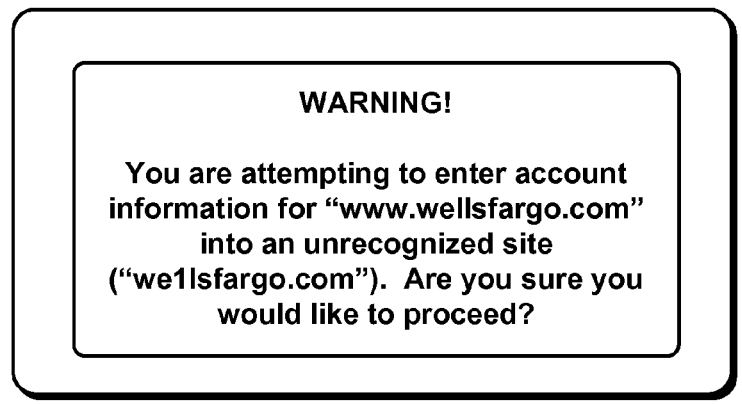
FIG. 4 is an illustration of an exemplary notification that may be used to warn a user of a potential phishing attack.

FIG. 4 is an illustration of an exemplary warning 400 that may be generated and provided to a user. As illustrated in this figure, warning 400 may indicate that the user is attempting to enter credentials for a known-legitimate website (such as "www.wellsfargo.com") into an unrecognized website (such as "wells fargo.com," in which the first "L" in "wellsfargo" has been replaced with the number "1").

The systems described herein may perform step 306 in a variety of ways. In one example, security module 106 (which may, as detailed above, represent a module installed on computing device 202, backend 206, and/or proxy/provider 208 in FIG. 2) may only generate the above-described warning if security module 106 is able to determine or confirm, based at least in part on an evaluation of at least one characteristic of the new website, that the new website potentially represents a phishing attack. For example, since some users use the same credentials across multiple legitimate websites, the systems described herein may only protect credentials from passing to a new website if such systems are able to confirm or determine that the new website potentially represents a phishing attack.

The systems described herein may confirm or determine that a new website potentially represents a phishing attack in a variety of ways. For example, security module 106 may determine that the domain name of new website 212 is confusingly or suspiciously similar to the domain name of a known-legitimate website, such as known-legitimate website 210. For example, security module 106 may determine that a user of computing device 202 is attempting to send credentials that are associated with the known-legitimate website "www.wellsfargo.com" to the website "www.wellsfargo-.com," which has replaced the first "L" in "wellsfargo" with the number "1" in an attempt to trick users into believing that the site is legitimate.

A variety of different known or new techniques may be used and/or combined to detect confusingly or suspiciously similar domain names. For example, security module 106 may (1) identify attempts to mimic known-legitimate web domains by utilizing algorithms (such as the Levenshtein algorithm, the Damerau-Levenshtein algorithm, and/or the Jaro-Winkler algorithm) that employ various metrics to calculate the similarity of a particular web domain to the web domain of a known-legitimate website, (2) detect identical (or nearly identical) web domains with different domain-extension information (such as "www.wellsfargo.cn," as opposed to "www.wellsfargo.com"), and/or (3) identify variations of known-legitimate web domains that may occur due to user error (such as misspellings, typos, etc.).

In another example, the systems described herein may determine that the new website potentially represents a phishing attack if the new website's domain is an IP address, as opposed to a text-based domain, since phishing attacks may use IP addresses as their web domain in an attempt to obfuscate the actual identity of the website. The systems described herein may also determine that the new website potentially represents a phishing attack if the new website's IP address has been used in connection with a prior phishing attack, the new website's registration date differs from the known-legitimate website's registration date, and/or if the new website is hosted at a geolocation that differs from the location at which the known-legitimate website is hosted.

The systems described herein may also determine that the new website potentially represents a phishing attack if the new website fails to satisfy a predetermined prevalence threshold within a computing community. For example, backend 206 in FIG. 2 may collect information from a plurality of computing devices within a computing community (such as the user base of a security software vendor) that identifies websites into which credentials are entered by users of such devices. In this example, if a particular website has been visited by a minimum number of users within the computing community, then this website may be classified as legitimate. Conversely, if a particular website has not been visited by a minimum number of users (i.e., if the website fails to satisfy a predetermined prevalence threshold), then this website may be classified as potentially malicious.

In some examples, upon determining that the new website potentially represents a phishing attack, the systems described herein may perform at least one security action in connection with the website. For example, security module 106 may prevent credentials or other information from passing to new website 212, may transmit information that identifies new website 212 as potentially malicious to backend 206 (which may, as detailed above, be maintained or operated by a security-software vendor), add new website 212 to a blacklist (either directly or by way of backend 206), or perform any other action that may thwart the illegitimate purpose of new website 212.

In some examples, the systems described herein may dynamically modify or tailor the warning generated in step 306 based at least in part on one or more characteristics of (1) the new website itself, (2) the credentials that the user attempted to pass to the new website, and/or (3) the known-legitimate website associated with the credentials in question. For example, if security module 106 determines, by analyzing credentials store 120, that the user has used the credentials in question before in connection with multiple legitimate websites (i.e., the user has re-used the same username and/or password in connection with multiple legitimate sites), then the warning generated at step 306 may simply indicate that the user has previously used the credentials in question in connection with other websites, as opposed to indicating that the new website potentially represents a phishing attack.

The language, appearance, and/or seriousness of the warning generated in step 306 may also be modified or tailored based on (or to reflect) a variety of additional characteristics or determinations, such as whether the new website's domain is confusingly similar to the known-legitimate website's domain, whether the new website's domain is an IP address as opposed to a text-based domain, whether the new website's IP address has been used in connection with a prior phishing attack, whether the new website's registration date differs from the known-legitimate website's registration date, whether the new website is hosted at a geolocation that differs from a geolocation at which the known-legitimate website is hosted, whether the new website fails to satisfy a predetermined prevalence threshold within the computing community, or the like.

In some examples, the systems described herein may accept the new website as legitimate (and thus refrain from generating future warnings in connection with the new website) if a user attempts to enter credentials for the website more than a predetermined number of times. For example, security module 106 may, upon detecting a predetermined number of attempts (such as, e.g., five) by the user of computing device 202 to enter the credentials detected in step 304 into new website 212, (1) assume that new website 212 is legitimate, (2) refrain from generating future warnings regarding new website 212, and then (3) associate these credentials with new website 212 within credentials store 120. In this example, if the credentials associated with new website 212 are subsequently entered into another unexpected website, these subsequent entries may be detected and treated in the manner described above in connection with exemplary method 300 in FIG. 3.

In another example, the systems described herein may accept the new website as legitimate (and thus refrain from generating future warnings in connection with the new website) if a user manually indicates that the new website represents a legitimate website. For example, security module 106 may receive (e.g., in response to the warning generated in step 306) an indication from the user of computing device 202 that new website 212 represents a legitimate website. In this example, security module 106 may then (1) assume that new website 212 is legitimate, (2) refrain from generating future warnings regarding new website 212, and then (3) associate the credentials in question with new website 212 within credentials store 120.

As detailed above, by detecting and preventing a user's credentials from passing to unexpected websites, the systems and methods described herein may 1) automatically identify and protect credentials for important websites, 2) automatically allow such credentials to pass to legitimate websites while blocking the same from passing to illegitimate websites, and 3) reduce false positives by protecting against specific phishing tricks, including the use of confusingly similar domain names and/or IP addresses instead of text-based domain names. Moreover, by leveraging an existing credentials store, the systems and methods described herein may (1) provide immediate protection against phishing attacks (instead of potentially missing phishing occurrences during a credentials-initialization process) and/or (2) protect a user's credentials regardless of which websites the user visits (as opposed to only protecting a limited set of credentials associated with websites that a security vendor deems important), potentially resulting in increased protection and reduced false positives.

Figure 5:
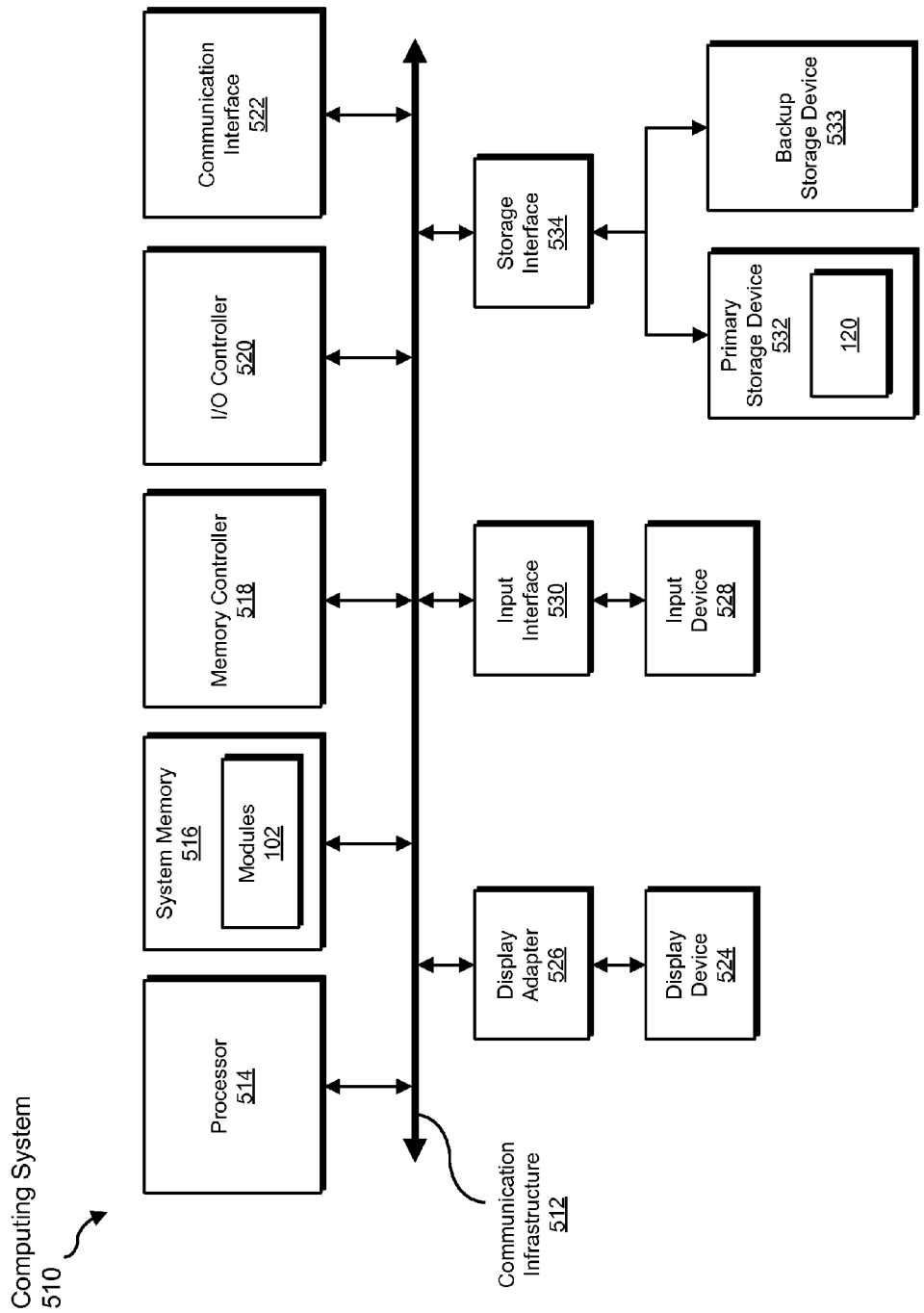
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the maintaining, detecting, warning, creating, accessing, determining, performing, tailoring, associating, and receiving steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, credentials store 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
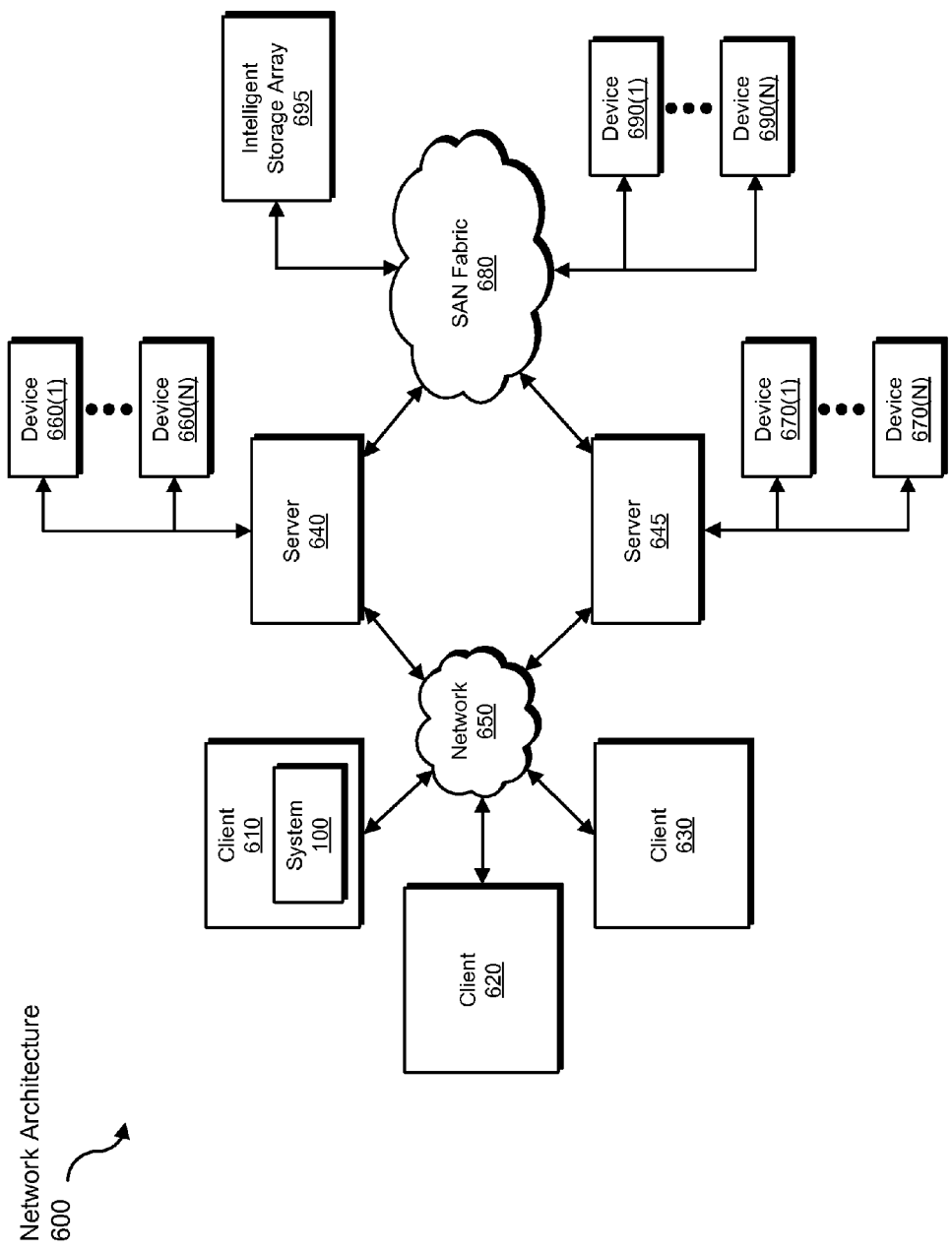
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the maintaining, detecting, warning, creating, accessing, determining, performing, tailoring, associating, and receiving steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for automatically detecting and preventing phishing attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform computing device 202 in FIG. 2 into a device that is able to automatically detect and prevent phishing attacks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically detecting and preventing phishing attacks, at least a portion of the method being performed by a computing device comprising at least one processor, the method comprising:
   maintaining a credentials store for a user of the computing device, wherein the credentials store identifies:
      at least one known-legitimate website;
      credentials associated with the known-legitimate website;
   detecting an attempt by the user to enter the same credentials that are associated with the known-legitimate website into a new website;
   determining that the new website is not associated with the credentials in the credentials store;
   after determining that the new website is not associated with the credentials in the credentials store, confirming that the new website potentially represents a phishing attack based on an evaluation of at least one characteristic of the website's registration with a hosting service;
   after confirming that the new website potentially represents a phishing attack, and prior to allowing the credentials to pass to the new website, automatically warning the user that the new website potentially represents an attempt to phish the credentials associated with the known-legitimate website from the user;
   upon warning the user, detecting a predetermined number of additional attempts by the user to enter the same credentials that are associated with the known-legitimate website into the new website; and
   upon detecting the predetermined number of additional attempts:
      assuming that the new website is legitimate;
      refraining from generating future warnings regarding the new website; and
      associating the credentials with the new website in the credentials store.

2. The method of claim 1, wherein maintaining the credentials store for the user comprises at least one of:
   creating the credentials store; and
   accessing an existing credentials store.

3. The method of claim 1, wherein the step of detecting the attempt is performed by at least one of:
   a browser plug-in installed on the computing device;
   a network proxy positioned between the computing device and the new website; and
   a service provider that provides the computing device with access to the new website.

4. The method of claim 1, wherein confirming that the new website potentially represents a phishing attack further comprises at least one of:
   determining that the new website's IP address has been used in connection with a prior phishing attack;
   determining, based at least in part on information gathered from a plurality of additional computing devices within a computing community, that the new website fails to satisfy a predetermined prevalence threshold within the computing community;
   determining that the new website's domain is confusingly similar to the known-legitimate website's domain; and
   determining that the new website's domain is an IP address as opposed to a text-based domain.

5. The method of claim 1, wherein confirming that the new website potentially represents a phishing attack based on an evaluation of at least one characteristic of the website's registration with a hosting service comprises at least one of:
   determining that the new website's registration date differs from the known-legitimate website's registration date; and
   determining that the new website is hosted at a geolocation that differs from a geolocation at which the known-legitimate website is hosted.

6. The method of claim 1, wherein the step of confirming that the new website potentially represents a phishing attack is performed by at least one of:
   the computing device; and
   a backend computing device that is remote from the computing device.

7. The method of claim 1, further comprising, upon confirming that the new website potentially represents a phishing attack, performing at least one security action in connection with the new website.

8. The method of claim 1, further comprising tailoring the warning based at least in part on at least one of:
   at least one characteristic of the new website;
   at least one characteristic of the known-legitimate website; and
   at least one characteristic of the credentials associated with the known-legitimate website.

9. The method of claim 7, wherein performing the security action comprises at least one of:
   transmitting information that identifies the new website as potentially malicious to a backend computing device that is remote from the computing device; and
   adding the new website to a blacklist of potential phishing sites, wherein the blacklist of potential phishing sites is maintained by at least one of:
      the computing device; and
      the backend computing device that is remote from the computing device.

10. The method of claim 1, further comprising:
   receiving an indication from the user that the new website represents a legitimate website; and
   in response to receiving the indication, associating the credentials with the new website in the credentials store.

11. A system for automatically detecting and preventing phishing attacks, the system comprising:
   a credentials-management module programmed to maintain a credentials store for a user of a computing device, wherein the credentials store identifies:
      at least one known-legitimate website;
      credentials associated with the known-legitimate website;
   a security module programmed to:
      detect an attempt by the user to enter the same credentials that are associated with the known-legitimate website into a new website;
      determine that the new website is not associated with the credentials in the credentials store;
      after determining that the new website is not associated with the credentials in the credentials store, confirm that the new website potentially represents a phishing attack based on an evaluation of at least one characteristic of the website's registration with a hosting service;

after confirming that the new website potentially represents a phishing attack, and prior to allowing the credentials to pass to the new website, automatically warn the user that the new website potentially represents an attempt to phish the credentials associated with the known-legitimate website from the user;

upon warning the user, detect a predetermined number of additional attempts by the user to enter the same credentials that are associated with the known-legitimate website into the new website; and upon detecting the predetermined number of additional attempts:
    assume that the new website is legitimate;
    refrain from generating future warnings regarding the new website; and
    associate the credentials with the new website in the credentials store;

at least one processor configured to execute the credentials-management module and the security module.

12. The system of claim 11, wherein the credentials-management module maintains the credentials store for the user by at least one of:
    creating the credentials store; and
    accessing an existing credentials store.

13. The system of claim 11, wherein the security module comprises at least one of:
    a browser plug-in installed on the computing device;
    a module installed on a network proxy positioned between the computing device and the new website;
    a module installed on a service provider that provides the computing device with access to the new website; and
    a module installed on a backend computing device that is remote from the computing device.

14. The system of claim 11, wherein the security module confirms that the new website potentially represents a phishing attack by at least one of:
    determining that the new website's IP address has been used in connection with a prior phishing attack;
    determining, based at least in part on information gathered from a plurality of additional computing devices within a computing community, that the new website fails to satisfy a predetermined prevalence threshold within the computing community;
    determining that the new website's domain is confusingly similar to the known-legitimate website's domain; and
    determining that the new website's domain is an IP address as opposed to a text-based domain.

15. The system of claim 11, wherein the security module confirms that the new website potentially represents a phishing attack based on an evaluation of at least one characteristic of the website's registration with a hosting service by at least one of:
    determining that the new website's registration date differs from the known-legitimate website's registration date; and
    determining that the new website is hosted at a geolocation that differs from a geolocation at which the known-legitimate website is hosted.

16. The system of claim 11, wherein the security module is further programmed to perform at least one security action in connection with the new website upon confirming that the new website potentially represents a phishing attack.

17. The system of claim 11, wherein the security module is further programmed to tailor the warning based at least in part on at least one of:
    at least one characteristic of the new website;
    at least one characteristic of the known-legitimate website; and
    at least one characteristic of the credentials associated with the known-legitimate website.

18. The system of claim 16, wherein the security action performed by the security module comprises at least one of:
    transmitting information that identifies the new website as potentially malicious to a backend computing device that is remote from the computing device; and
    adding the new website to a blacklist of potential phishing sites, wherein the blacklist of potential phishing sites is maintained by at least one of:
    the computing device; and
    the backend computing device that is remote from the computing device.

19. The system of claim 11, wherein:
    the security module is further programmed to receive an indication from the user that the new website represents a legitimate website; and
    in response to receiving the indication, the credentials-management module is further programmed to associate the credentials with the new website in the credentials store.

20. A non-transitory computer-readable-storage medium comprising one or more computer-executable instructions that, when executed by at least one processor of a computing device, cause the computing device to:
    maintain a credentials store for a user of the computing device, wherein the credentials store identifies:
        at least one known-legitimate website;
        credentials associated with the known-legitimate website;
    detect an attempt by the user to enter the same credentials that are associated with the known-legitimate website into a new website;
    determine that the new website is not associated with the credentials in the credentials store;
    after determining that the new website is not associated with the credentials in the credentials store, confirm that the new website potentially represents a phishing attack based on an evaluation of at least one characteristic of the website's registration with a hosting service;
    after confirming that the new website potentially represents a phishing attack, and prior to allowing the credentials to pass to the new website, automatically warn the user that the new website potentially represents an attempt to phish the credentials associated with the known-legitimate website from the use;
    upon warning the user, detect a predetermined number of additional attempts by the user to enter the same credentials that are associated with the known-legitimate website into the new website; and
    upon detecting the predetermined number of additional attempts:
        assume that the new website is legitimate;
        refrain from generating future warnings regarding the new website; and
        associate the credentials with the new website in the credentials store.

\* \* \* \* \*

UNITED STATES PATENT AND TRADEMARK OFFICE
CERTIFICATE OF CORRECTION

| | | |
|---|---|---|
| PATENT NO. | : 8,776,196 B1 | Page 1 of 1 |
| APPLICATION NO. | : 13/557051 | |
| DATED | : July 8, 2014 | |
| INVENTOR(S) | : Ian Oliver et al. | |

It is certified that error appears in the above-identified patent and that said Letters Patent is hereby corrected as shown below:

IN THE CLAIMS:

Claim 20, at column 18, lines 47 to 52, should read:

after confirming that the new website potentially represents a phishing attack, and prior to allowing the credentials to pass to the new website, automatically warn the user that the new website potentially represents an attempt to phish the credentials associated with the known-legitimate website from the user;

Signed and Sealed this
Thirtieth Day of December, 2014

Michelle K. Lee
*Deputy Director of the United States Patent and Trademark Office*